US012694854B2

(12) United States Patent
Uchida

(10) Patent No.: US 12,694,854 B2
(45) Date of Patent: Jul. 28, 2026

(54) CYMBAL HOLDING STRUCTURE AND HOLDING DEVICE

(71) Applicant: YAMAHA CORPORATION, Hamamatsu (JP)

(72) Inventor: Yuki Uchida, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 288 days.

(21) Appl. No.: 18/650,440

(22) Filed: Apr. 30, 2024

(65) Prior Publication Data

US 2024/0379079 A1 Nov. 14, 2024

(30) Foreign Application Priority Data

May 9, 2023 (JP) ................................ 2023-077042

(51) Int. Cl.
*G10D 13/10* (2020.01)
*G10D 13/063* (2020.01)

(52) U.S. Cl.
CPC ........... *G10D 13/28* (2020.02); *G10D 13/063* (2020.02)

(58) Field of Classification Search
CPC ...... G10D 13/28; G10D 13/063; G10D 13/10; G10G 5/00
See application file for complete search history.

(56) References Cited

U.S. PATENT DOCUMENTS

| | | | | |
|---|---|---|---|---|
| 9,355,625 | B1 * | 5/2016 | Takegawa | G10D 13/28 |
| 11,170,745 | B1 | 11/2021 | Cabo | |

* cited by examiner

*Primary Examiner* — Kimberly R Lockett
(74) *Attorney, Agent, or Firm* — ROSSI, KIMMS & McDOWELL LLP

(57) ABSTRACT

A holding structure for a cymbal includes a cymbal stand that includes: a rod configured to be insertable through a cymbal; and a supporting part that is provided on the rod, the supporting part being configured to support the cymbal through which the rod is inserted. The holding structure further includes a holding device attachable to the rod, the holding device being configured to clamp the cymbal between the holding device and the supporting part supporting the cymbal. The holding device includes: an engaging part including an opening in which the rod is arranged in a state where the holding device is attached to the rod, the engaging part being configured to be engaged to the rod in a state of being immovable in a lengthwise direction of the rod; an adjusting part attached to the engaging part.

8 Claims, 7 Drawing Sheets

CYMBAL HOLDING STRUCTURE AND HOLDING DEVICE

CROSS-REFERENCE TO RELATED APPLICATIONS

The present application claims priority to Japanese Patent Application No. 2023-77042, filed May 9, 2023, the contents of which are incorporated herein by reference.

BACKGROUND

Technical Field

The present disclosure relates to a holding structure and a holding device for a cymbal.

Background Art

U.S. Pat. No. 11,170,745 (hereinafter referred to as Patent Document 1) discloses a quick release clamp (holding device) for easily holding a cymbal on a stand (cymbal stand). The quick release clamp has: an opening part through which the stand is inserted; a clamp jaw that changes the size of the opening part between a closed position and an open position, with the stand having been inserted through the opening part; an operator for changing the position of the clamp jaw; a housing in which the opening part, the clamp jaw, and the operator are arranged; and an elastic member provided between the operator and the housing.

In this quick release clamp, the operator is pressed and held in a predetermined position by the force of the elastic member, so that the operator holds the clamp jaw at the closed position. Moreover, the clamp jaw is moved from the closed position to the open position by operating the operator against the force of the elastic member. The clamp jaw is held at the closed position to thereby attach the quick release clamp to the stand. Furthermore, by moving the clamp jaw to the open position, the attachment of the quick release clamp to the stand is released.

SUMMARY

When, in Patent Document 1, a cymbal is clamped between the quick release clamp and the supporting part of the stand, the form in which the cymbal is held changes as a result of the distance changing between the quick release clamp and the supporting part. For example, depending on the distance between the quick release clamp and the supporting part, the magnitude of the force that holds the cymbal between them changes. This changes the form in which the cymbal swings when the cymbal is struck.

However, in the quick release clamp of Patent Document 1, the female thread of the clamp jaw is configured to mesh with the male thread of the stand. Therefore, in order to reproduce the form in which the cymbal is held, it is necessary to adjust the distance between the quick release clamp and the supporting part every time the quick release clamp is attached to the stand. For this reason, it is difficult to reproduce the form in which the cymbal is held.

The present disclosure takes into consideration the above circumstances. One object of the present disclosure is to provide a holding structure and a holding device for a cymbal capable of easily reproducing a form in which a cymbal is held between the holding device and a supporting part of a cymbal stand.

An aspect of the present disclosure is a holding structure for a cymbal, including: a cymbal stand that includes: a rod configured to be insertable through a cymbal; and a supporting part that is provided on the rod, the supporting part being configured to support the cymbal through which the rod is inserted; and a holding device attachable to the rod, the holding device being configured to clamp the cymbal between the holding device and the supporting part supporting the cymbal. The holding device includes: an engaging part including an opening in which the rod is arranged in a state where the holding device is attached to the rod, the engaging part being configured to be engaged to the rod in a state of being immovable in a lengthwise direction of the rod; an adjusting part attached to the engaging part in a state of being movable relative to the engaging part in the lengthwise direction of the rod, the adjusting part being positioned between the engaging part and the supporting part in the state where the holding device is attached to the rod; and a pressing part. The adjusting part includes a sliding surface that is in contact with the engaging part, the sliding surface being configured to slide relative to the engaging part when the adjusting part moves relative to the engaging part. The pressing part is configured to suppress movement of the adjusting part, in the lengthwise direction of the rod, relative to the engaging part by pressing the sliding surface of the adjusting part against the engaging part.

Another aspect of the present disclosure is a holding device for a cymbal stand. The cymbal stand includes a rod configured to be insertable through a cymbal and a supporting part that is provided on the rod, the supporting part being configured to support the cymbal through which the rod is inserted, the holding device being configured to be attachable to the rod, and the holding device being configured to clamp the cymbal between the holding device and the supporting part supporting the cymbal. The holding device includes: an engaging part including an opening in which the rod is arranged in a state where the holding device is attached to the rod, the engaging part being configured to be engaged to the rod in a state of being immovable in a lengthwise direction of the rod; an adjusting part attached to the engaging part in a state of being movable relative to the engaging part in the lengthwise direction of the rod, the adjusting part being positioned between the engaging part and the supporting part in the state where the holding device is attached to the rod; and a pressing part. The adjusting part includes a sliding surface that is in contact with the engaging part, the sliding surface being configured to slide relative to the engaging part when the adjusting part moves relative to the engaging part. The pressing part is configured to suppress movement of the adjusting part, in the lengthwise direction of the rod, relative to the engaging part by pressing the sliding surface of the adjusting part against the engaging part.

DETAILED DESCRIPTION OF THE EMBODIMENTS

Hereinafter, embodiments of the present disclosure will be described, with reference to FIG. 1 to FIG. 7.

Figure 1:
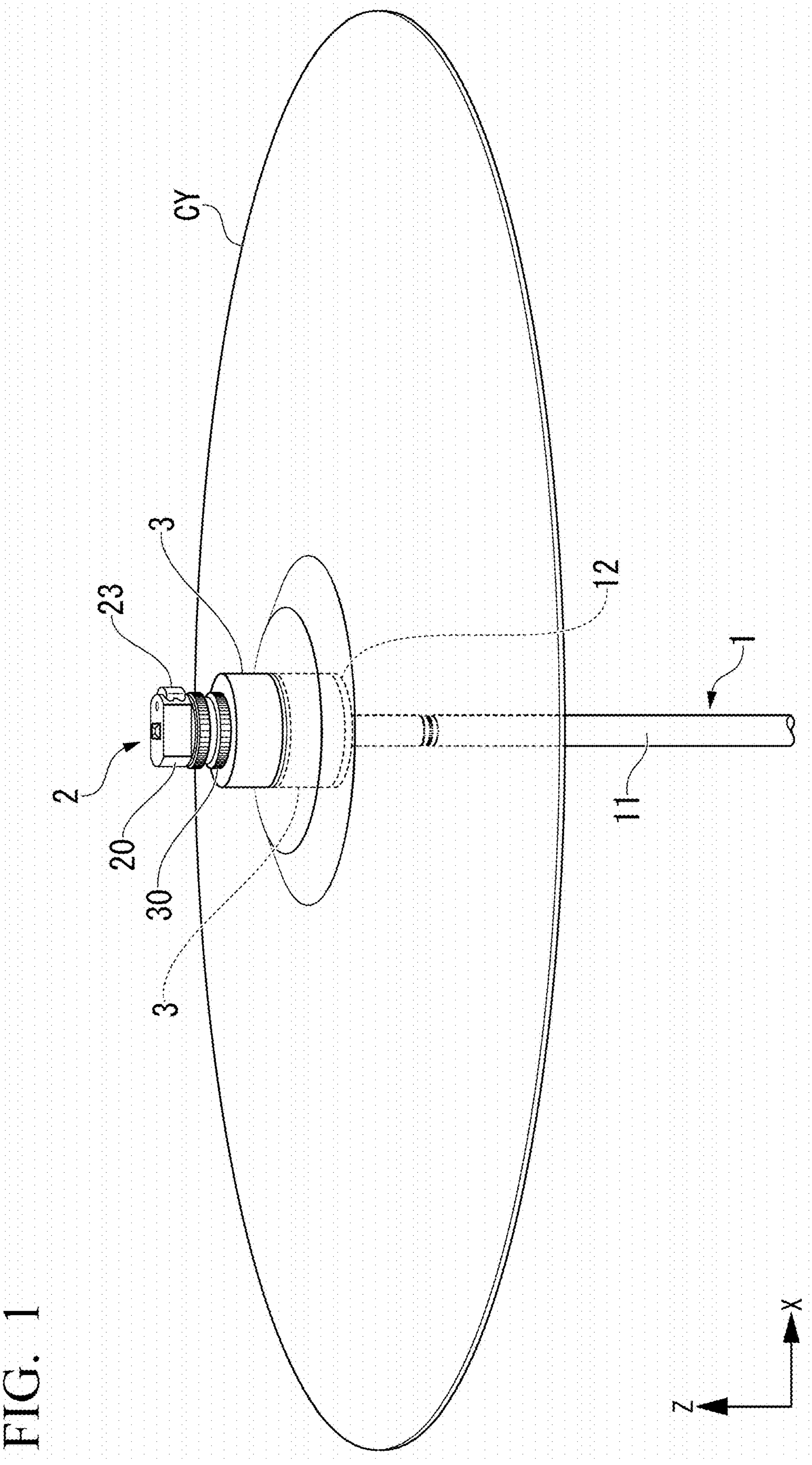
FIG. 1 is a perspective view showing a holding structure for a cymbal according to an embodiment of the present disclosure.
Figure 2:
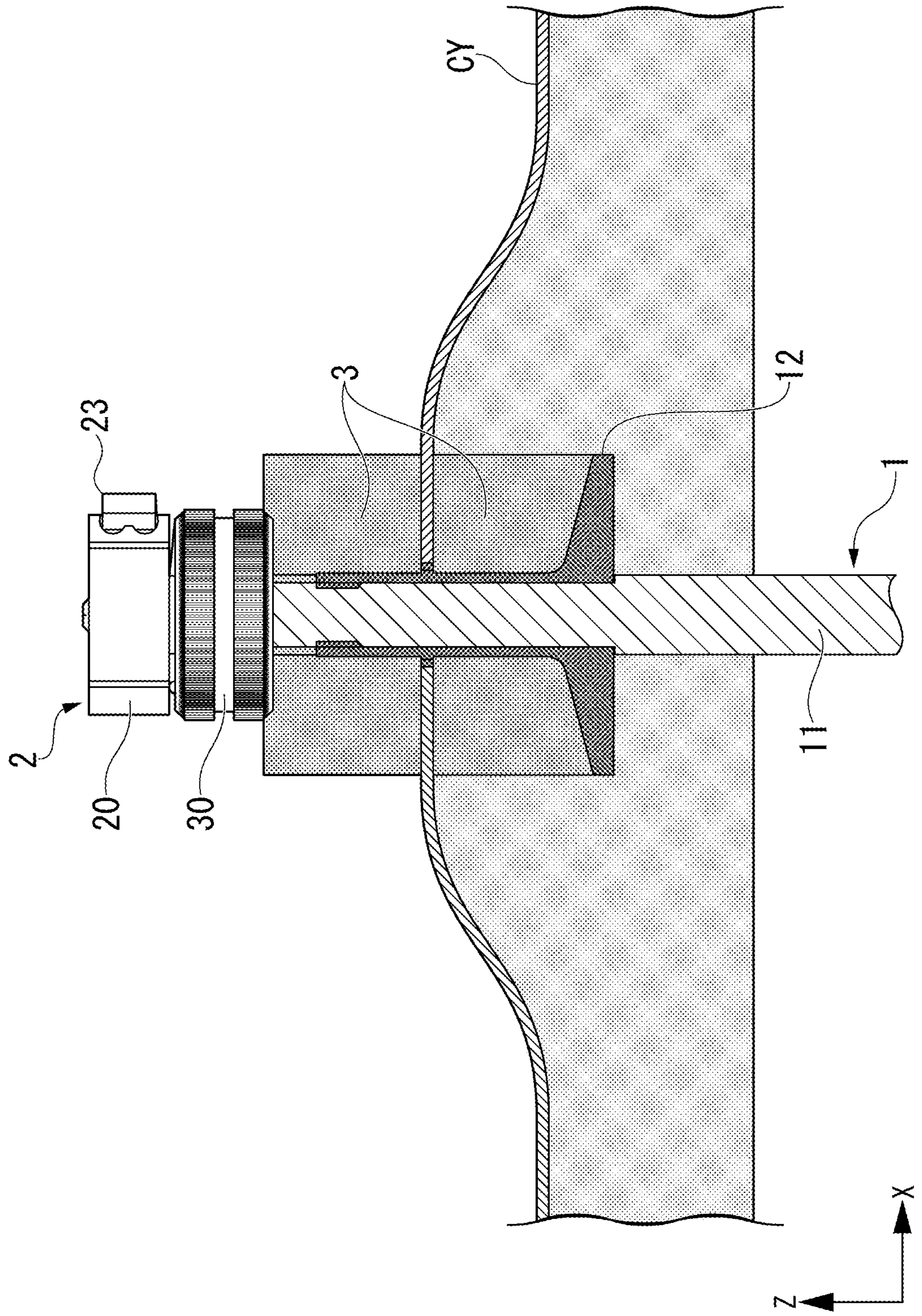
FIG. 2 is a cross-sectional view showing the holding structure for a cymbal of FIG. 1.

As shown in FIG. 1 and FIG. 2, a holding structure for a cymbal includes a cymbal stand 1 and a holding device (holding member) 2.

The cymbal stand 1 includes a rod 11 and a supporting part 12. The rod 11 is inserted through a cymbal CY. The supporting part 12 is provided on the rod 11 and supports the cymbal CY, through which the rod 11 is inserted.

Figure 3:
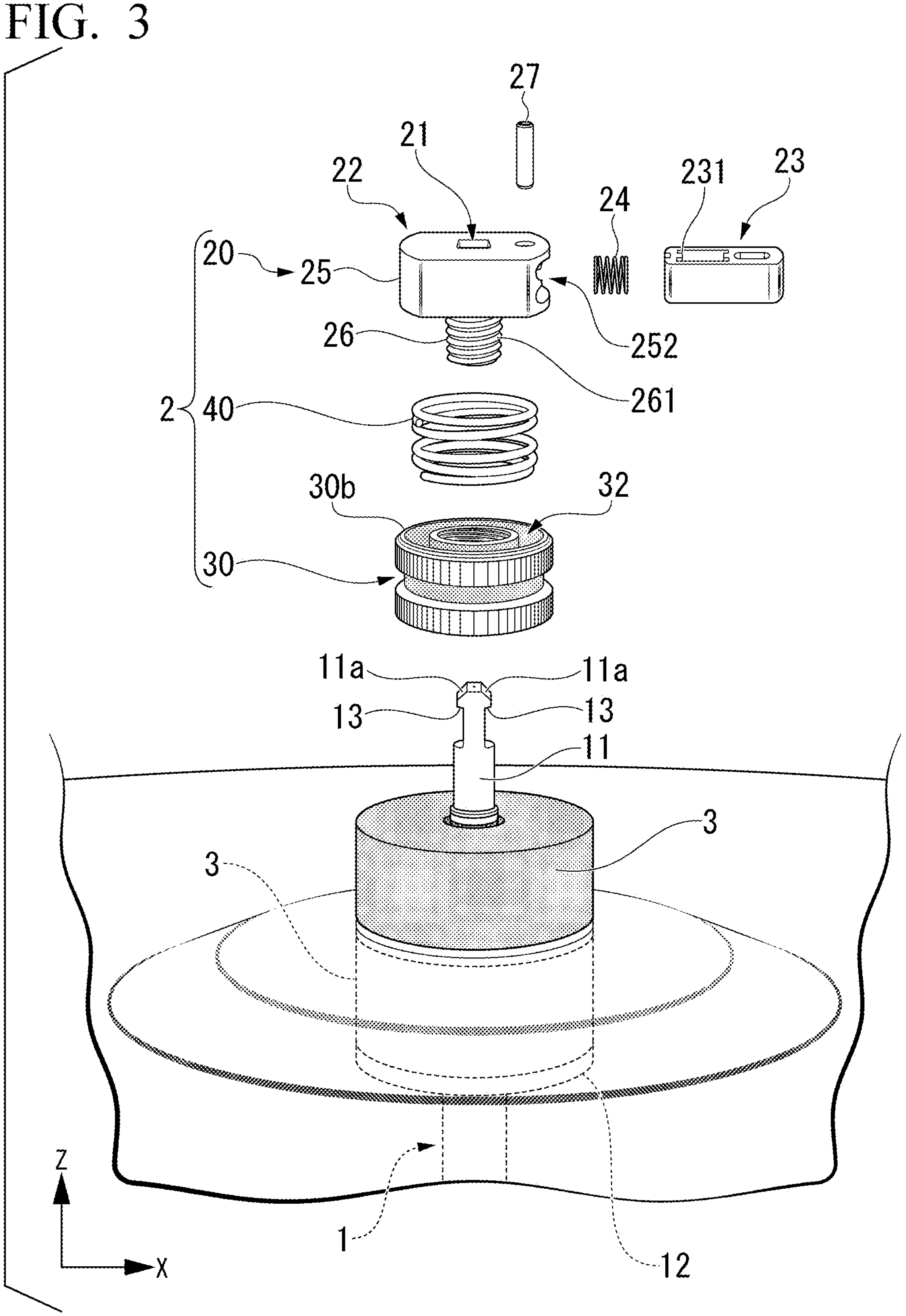
FIG. 3 is a perspective view showing a holding device in a state of having been removed from a rod and been disassembled in the holding structure for a cymbal of FIG. 1 and FIG. 2.
Figure 4:
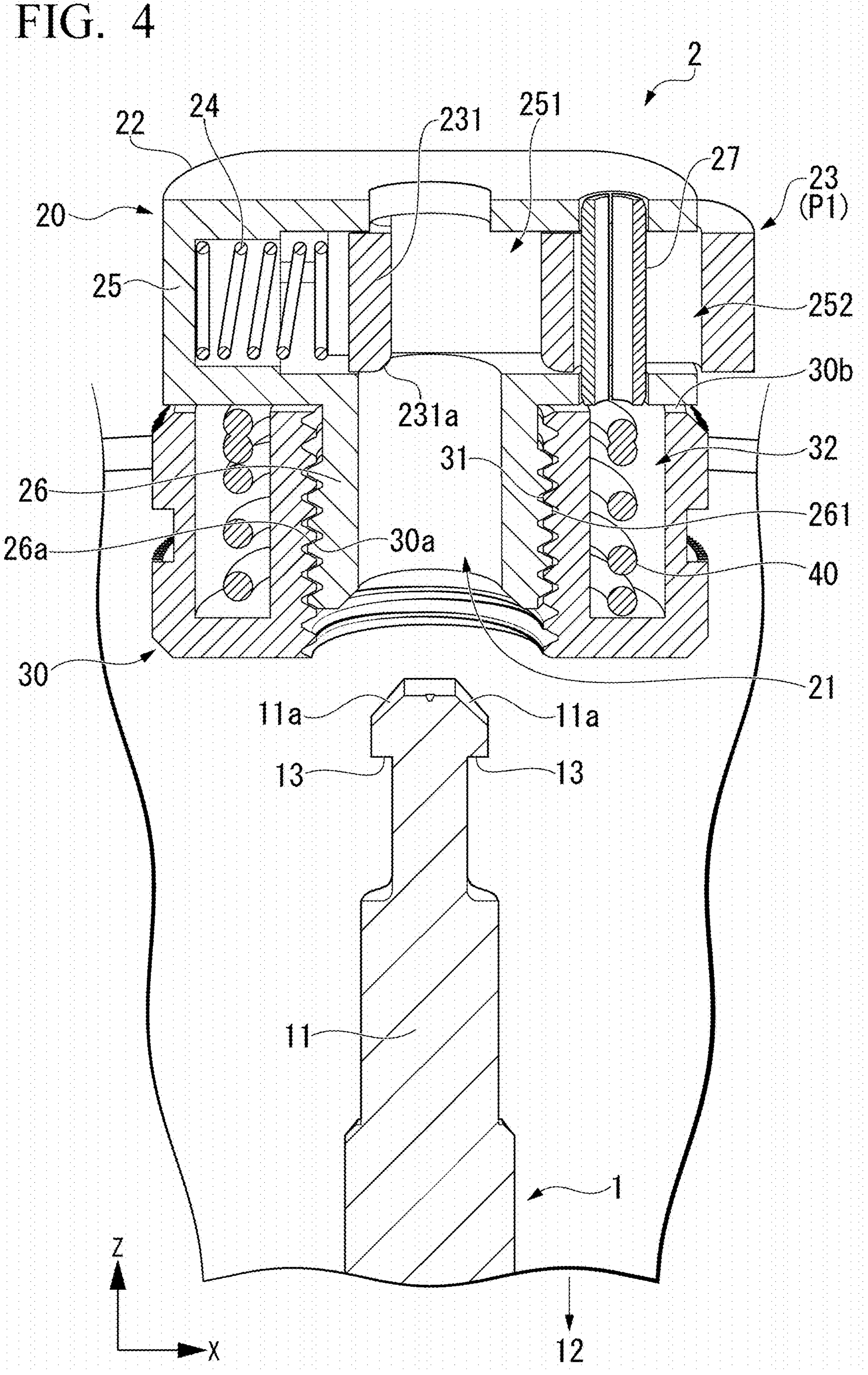
FIG. 4 is an enlarged cross-sectional view showing the rod and the holding device before being attached to the rod in the holding structure for a cymbal of FIG. 1 and FIG. 2.

As shown in FIG. 3 and FIG. 4, the rod 11 has an engaging recess (engaging recess part, locking recess) 13. The engaging recess 13 is recessed from a side surface of the rod 11 at a distal end side portion of the rod 11 located on the distal end side of the supporting part 12. The engaging recess 13 is formed in a part of the side surface of the rod 11 in the circumferential direction. Moreover, the rod 11 has a plurality of engaging recesses 13 (two in the example of the drawings), and the plurality of engaging recesses 13 are arranged at intervals in the circumferential direction of the rod 11. It should be noted that the engaging recesses 13 may be formed, for example, on the entire circumferential side of the rod 11. The engaging recesses 13 of the rod 11 are provided to engage (lock) the holding device 2 to the rod 11, which will be described later.

The distal end part of the rod 11 has an inclined surface 11*a*. The inclined surface 11*a* of the rod 11 slopes toward the distal end side of the rod 11, with approaching toward the inner side from the outer side of the rod 11 in the radial direction. That is to say, the distal end part of the rod 11 is formed in a tapered shape. The inclined surface 11*a* of the rod 11 is positioned closer to the distal end side of the rod 11 than the engaging recess 13 mentioned above.

The distal end part of the rod 11 has a plurality of inclined surfaces 11*a* (two in the example of the drawings). The plurality of inclined surfaces 11*a* are arranged at intervals in the circumferential direction of the rod 11. The number of the inclined surfaces 11*a* of the rod 11 in the example shown in the drawings corresponds to the number of the engaging recesses 13 mentioned above. Moreover, the positions of the inclined surfaces 11*a* in the circumferential direction of the rod 11 correspond to the positions of the engaging recesses 13. It should be noted that the inclined surfaces 11*a* of the rod 11 may be formed over the entire circumference of the rod 11, for example.

As shown in FIG. 1 and FIG. 2, the holding device 2 is attached to the rod 11, and clamps and holds the cymbal CY between the holding device 2 itself and the supporting part 12. In FIG. 1 and FIG. 2, buffer members 3 made of felt are provided between the supporting part 12 and the cymbal CY, and between the cymbal CY and the holding device 2, respectively. The buffer members 3 protect the cymbal CY from the supporting part 12 and the holding device 2, and suppress or prevent unnecessary sound from being generated when the cymbal CY comes into contact with the supporting part 12 and the holding device 2.

As shown in FIG. 3 and FIG. 4, the holding device 2 includes an engaging part 20, an adjusting part 30, and a pressing part 40.

Figure 6:
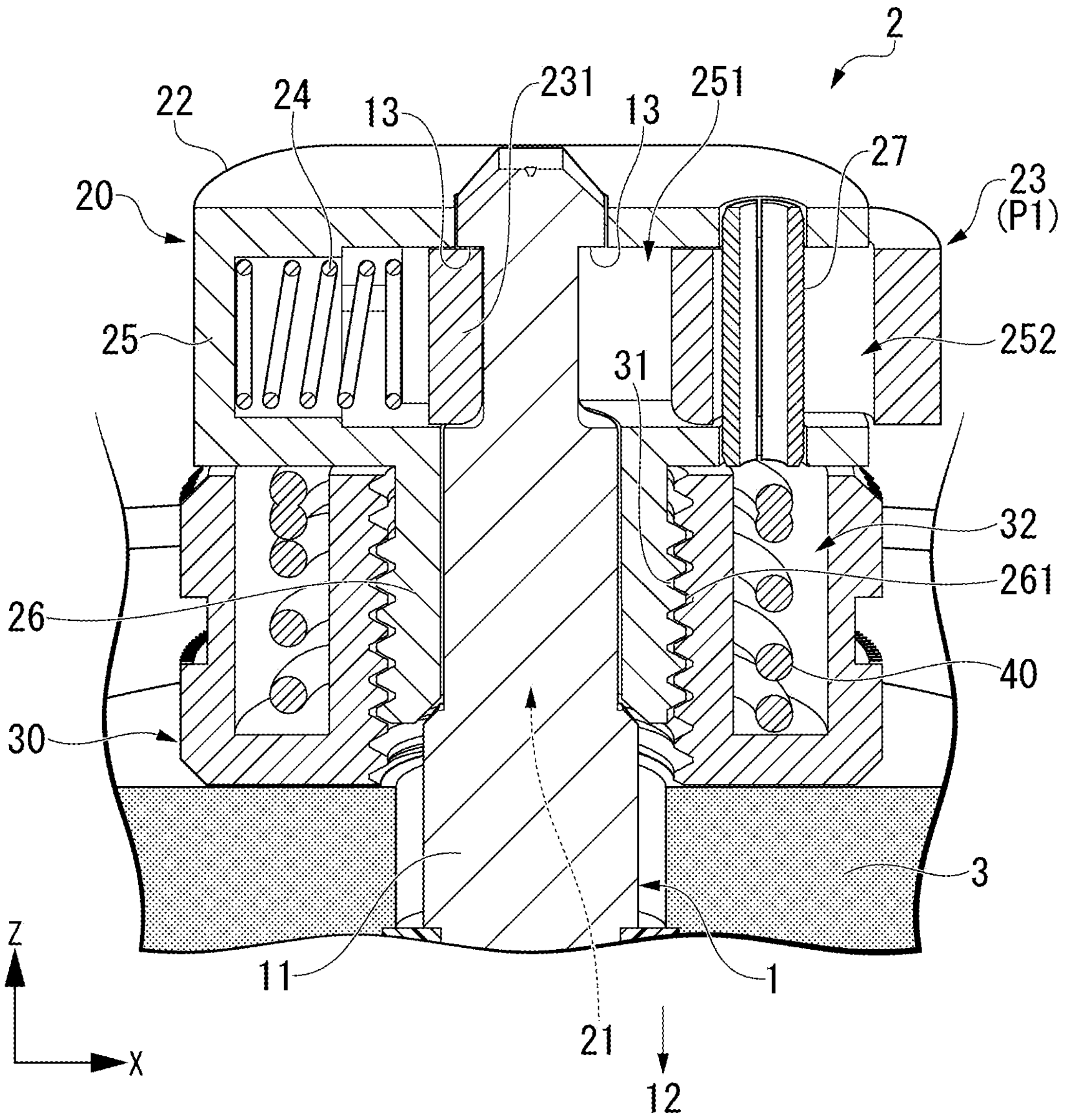
FIG. 6 is an enlarged cross-sectional view showing a state in which the holding device is attached to the rod in the holding structure for a cymbal of FIG. 1 and FIG. 2.

As shown in FIG. 4 and FIG. 6, the engaging part 20 has an opening 21 in which the rod 11 is placed with the holding device 2 attached to the rod 11. The opening 21 of the engaging part 20 extends in the lengthwise direction of the rod 11 (Z-axis direction). Moreover, the engaging part (locking part) 20 is engaged (locked) so that it cannot move in the lengthwise direction of the rod 11 when the holding device 2 is attached to the rod 11 (see FIG. 6). In the example shown in the drawings, the opening 21 of the engaging part 20 penetrates through the engaging part 20, but the opening 21 does not need to penetrate through the engaging part 20, for example.

As shown in FIG. 3 and FIG. 4, the engaging part 20 includes a housing 22, a moving member 23, and an elastic member 24.

The housing 22 includes the opening 21, in which the rod 11 is arranged. The housing 22 has an accommodating portion 25 in which the moving member 23 and the elastic member 24 are accommodated, and an attachment portion 26 to which the adjusting part 30, which will be described later, is attached. The accommodating portion 25 and the attachment portion 26 are arranged in the extending direction (Z-axis direction) of the opening 21 corresponding to the lengthwise direction of the rod 11. The opening 21 of the housing 22 is provided across the accommodating portion 25 and the attachment portion 26.

The accommodating portion 25 has an internal space 251 that can accommodate the moving member 23 and the elastic member 24. The internal space 251 communicates with the opening 21 of the housing 22. Moreover, the accommodating portion 25 has an exposing opening 252 for allowing a part of the moving member 23 arranged in the internal space 251 to be exposed to the outside of the housing 22. The exposing opening 252 faces one side (X-axis positive direction side) in an orthogonal direction that is orthogonal to the extending direction (Z-axis direction) of the opening 21.

The adjusting part 30 is attached to the attachment portion 26 so as to be movable in the lengthwise direction of the rod (Z-axis direction). The attachment portion 26 has a sliding surface 26*a* that makes surface contact with the adjusting part 30 and slides when the adjusting part 30 moves relative to the attachment portion 26. In the attachment portion 26 of the present embodiment, the adjusting part 30 has a first thread 261 the axis of which extends along the lengthwise direction of the rod 11. The surface of this first thread 261 is the sliding surface 26*a* of the attachment portion 26 mentioned above.

The attachment portion 26 of the present embodiment is formed in a cylindrical shape extending from the accommodating portion 25 in the lengthwise direction of the rod 11 (Z-axis negative direction). The attachment portion 26 is smaller than the accommodating portion 25 when viewed from the lengthwise direction of the rod 11. The first thread 261 of the attachment portion 26 is provided on the outer circumferential surface of the attachment portion 26, which is of a cylindrical shape. That is to say, the first thread 261 is a male thread.

The moving member 23 is arranged in the internal space 251 of the housing 22 (inside the housing 22). The moving member 23 is movable within the housing 22 between an engaging position (locking position) P1 and a release position P2 (see FIG. 7). The engaging position P1 is a position at which the moving member 23 engages (locks) on the rod 11. The release position P2 is a position at which the engaging (locking) with the rod 11 is released.

In the present embodiment, the moving member 23 is movable within the housing 22 between the engaging position (locking position) P1 and the release position P2 in a direction orthogonal to the housing 22 (X-axis direction). The direction in which the moving member 23 is moved from the release position P2 to the engaging position P1 is a direction toward one side of the orthogonal direction (X-axis positive direction side), and the direction in which the moving member 23 is moved from the engaging position P1 to the release position P2 is a direction toward the other side of the orthogonal direction (X-axis negative direction side). It should be noted that the direction in which the moving member 23 is moved from the release position P2 to the engaging position P1 may be, for example, the direction toward the other side of the orthogonal direction (X-axis negative direction side).

A part of the moving member 23 is arranged so as to be exposed to the outside from the exposing opening 252 of the housing 22. This allows the user of the holding device 2 to operate the moving member 23. For example, when the user of the holding device 2 presses the moving member 23 toward the inside of the housing 22 with their fingers, the moving member 23 can be moved to the other side in the orthogonal direction, that is, the moving member 23 can be moved from the engaging position P1 toward the release position P2.

The retaining pin 27 attached to the housing 22 restricts the movement of the moving member 23 from the engaging position P1 toward one side of the orthogonal direction. As a result, it is possible to prevent the moving member 23 from moving further from the engaging position P1 toward the one side of the orthogonal direction and falling out of the housing 22 from the exposing opening 252.

Figure 7:
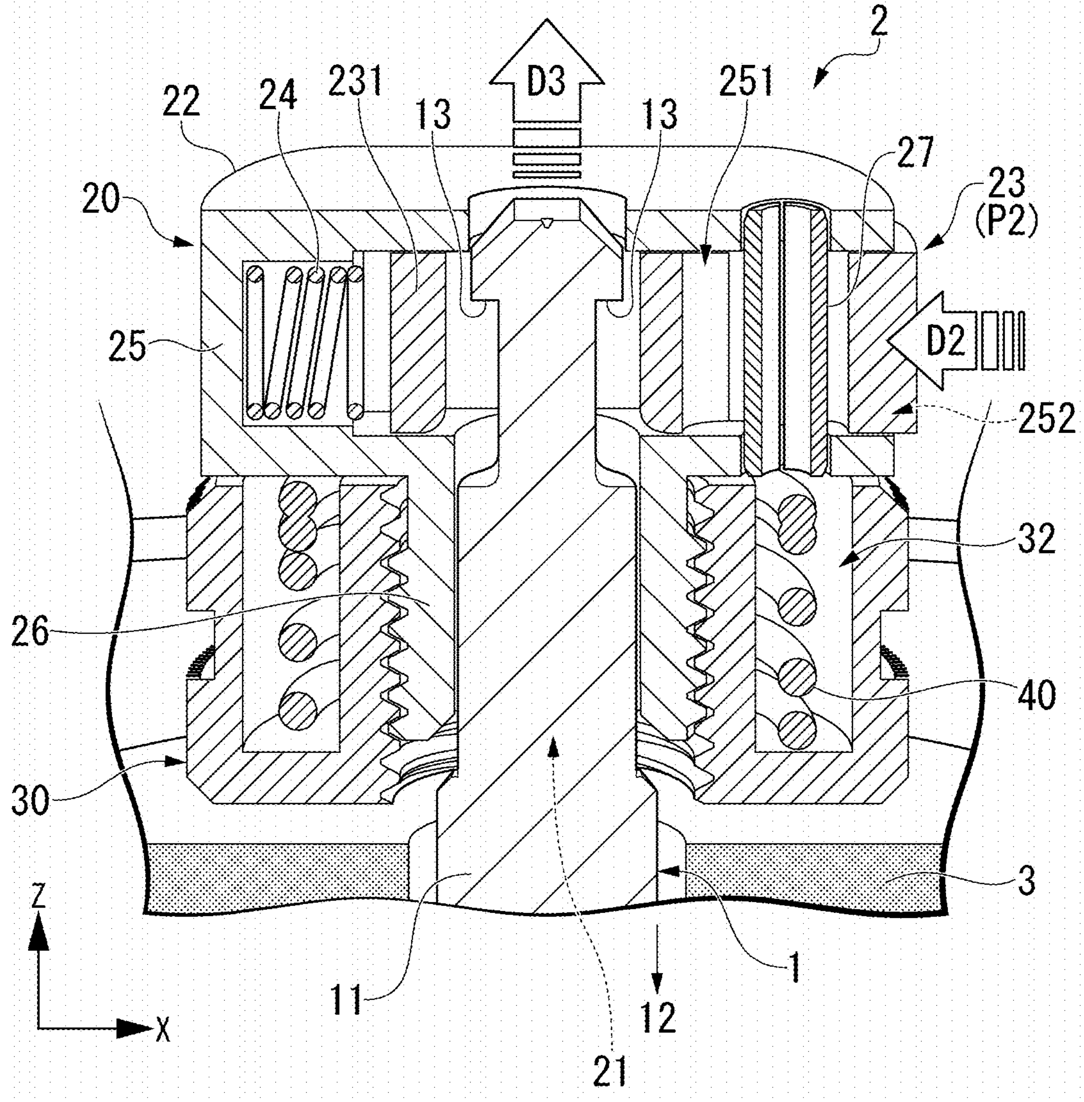
FIG. 7 is an enlarged cross-sectional view showing a state after a moving member of the holding device has been moved from a engaging position to a release position in the state shown in FIG. 6.

The moving member 23 has an engaging protrusion part (engaging protrusion part, locking protrusion) 231. As shown in FIG. 4, the engaging protrusion 231 protrudes toward the inner side of the opening 21 when the moving member 23 is arranged at the engaging position P1. Also, as shown in FIG. 7, the engaging protrusion 231 retracts to the outside of the opening 21 with the moving member 23 arranged at the release position P2. As shown in FIG. 6, the engaging protrusion 231 is inserted into the engaging recess 13 of the rod 11 inserted in the opening 21 of the engaging part 20 when the moving member 23 is arranged at the engaging position P1. Thereby, the engaging part 20 is engaged (locked) to the rod 11 so as not to be movable in the lengthwise direction (Z-axis direction).

As shown in FIG. 4, the engaging protrusion 231 has an inclined surface 231*a*. The inclined surface 231*a* of the engaging protrusion 231 is a surface facing in the direction in which the rod 11 is removed from the opening 21 of the engaging part 20 (Z-axis negative direction). The inclined surface 231*a* of the engaging protrusion 231 slopes in the direction in which the rod 11 is inserted into the opening 21 of the engaging part 20 (in the Z-axis positive direction), with approaching toward the protruding direction of the engaging protrusion 231 (X-axis positive direction side).

The elastic member 24 biases the moving member 23 toward the engaging position P1. In the internal space 251 of the housing 22, the elastic member 24 is arranged adjacent to the other side in the orthogonal direction (X-axis negative direction side) of the moving member 23, and is clamped between the inner surface of the housing 22 and the moving member 23. As a result, the elastic member 24 biases the moving member 23 to the one side in the orthogonal direction (X-axis positive direction side). The elastic member 24 in the example shown in the drawings is a coil spring, however, it may be made of rubber, for example.

The adjusting part 30 is detachably attached to the engaging part 20. The adjusting part 30 attached to the engaging part 20 is movable relative to the engaging part 20 in the lengthwise direction of the rod 11 (Z-axis direction). The adjusting part 30 has a sliding surface 30*a* that is in surface contact with the sliding surface 26*a* of the engaging part 20 and slides when moving relative to the engaging part 20. The adjusting part 30 of the present embodiment has a second thread 31 that meshes with the first thread 261 of the engaging part 20. The surface of the second thread 31 that is in surface contact with the first thread 261 is the sliding surface 30*a* of the adjusting part 30. By rotating the adjusting part 30 relative to the engaging part 20 with the second thread 31 meshed with the first thread 261, the adjusting part 30 moves in the lengthwise direction of the rod 11 relative to the engaging part 20.

The adjusting part 30 of the present embodiment is formed in a cylindrical shape. The second thread 31 of the adjusting part 30 is provided on the inner circumferential surface of the adjusting part 30, which is of a cylindrical shape. That is to say, the second thread 31 is a female thread.

The adjusting part 30 of the present embodiment has an accommodating recess part 32 in which a pressing part 40, which will be described later, is accommodated. The accommodating recess part 32 opens at an opposing surface 30*b* of the adjusting part 30 that faces the accommodating portion 25 of engaging part 20 in the lengthwise direction of the rod 11 when the adjusting part 30 is attached to the engaging part 20. As shown in FIG. 3 and FIG. 4, the accommodating recess part 32 is formed around the entire circumference of the adjusting part 30. That is to say, the accommodating recess part 32 is formed in a ring shape when the adjusting part 30 is viewed from the axial direction thereof (Z-axis direction).

The adjusting part 30 is located in the direction (Z-axis negative direction) with respect to the engaging part 20 in which the rod 11 is removed from the opening 21 of the engaging part 20. For this reason, as shown in FIG. 1 and FIG. 2, the adjusting part 30 attached to the engaging part 20 is positioned between the engaging part 20 and the supporting part 12 of the cymbal stand 1 when the holding device 2 is attached to the rod 11.

As shown in FIG. 4, the pressing part 40 presses the sliding surface 30*a* of the adjusting part 30 against the engaging part 20 to suppress the adjusting part 30 from moving in the lengthwise direction of the rod 11 relative to the engaging part 20. In the present embodiment, the pressing part 40 presses the surface of the second thread 31 (sliding surface 30*a* of the adjusting part 30) against the surface of the first thread 261 (sliding surface 26*a* of the engaging part 20) in the lengthwise direction of the rod 11. The pressing part 40 is an elastic body, and is clamped between the engaging part 20 and the adjusting part 30 in the lengthwise direction of the rod 11. Thereby, the pressing part 40 presses the surface of the second thread 31 against the first thread 261 by the elastic force thereof.

As shown in FIG. 3 and FIG. 4, the pressing part 40 of the present embodiment is a coil spring. The pressing part 40 is arranged such that the axis of the coil spring approximately coincides with the axes of the first thread 261 of the engaging part 20 and the second thread 31 of the adjusting part 30. Thereby, the pressing part 40 can evenly press the surface of the second thread 31 against the first thread 261 around the circumferential direction of the first thread 261 and the second thread 31.

The pressing part 40, which is a coil spring, is accommodated in the accommodating recess part 32 of the adjusting part 30 formed in a ring shape. In a state where the adjusting part 30 is attached to the engaging part 20, the pressing part 40 is clamped between the accommodating portion 25 of the engaging part 20 and the bottom surface of the accommodating recess part 32 of the adjusting part 30. In this state, the pressing part 40 is hardly exposed, thereby ensuring the protection of the pressing part 40. It should be noted that the pressing part 40 is not limited to a coil spring, and may be made of, for example, rubber.

Next, an example of the usage method of the holding device 2 provided in the holding structure for a cymbal of the present embodiment will be described.

As shown in FIG. 4, when the holding device 2 is not attached to the rod 11, the moving member 23 of the engaging part 20 is positioned at the engaging position P1 by the biasing force of the elastic member 24. In this state, the engaging protrusion 231 of the moving member 23 protrudes toward the inside of the opening 21 of the housing 22.

Figure 5:
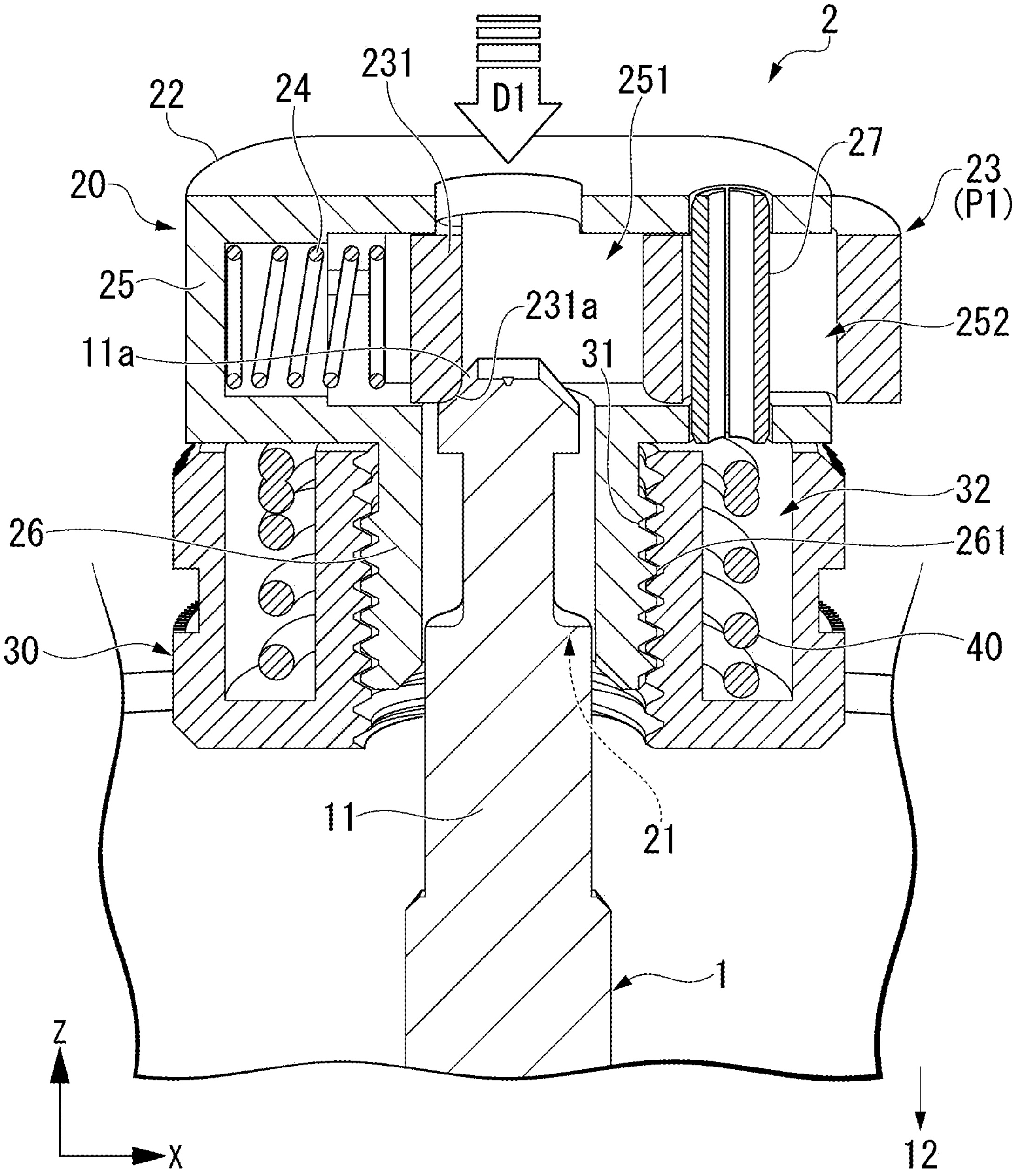
FIG. 5 is an enlarged cross-sectional view showing a process of attaching the holding device to the rod in the holding structure for a cymbal of FIG. 1 and FIG. 2.

When attaching the holding device 2 to the rod 11, then as shown in FIG. 5, the rod 11 is inserted into the opening 21 of the housing 22 so that the adjusting part 30 is positioned between the engaging part 20 (accommodating portion 25 in particular) and the supporting part 12 of the cymbal stand 1. The arrow D1 in FIG. 5 indicates the direction in which the holding device 2 is attached to the rod 11. At this time, the inclined surface 11*a* of the distal end part of the rod 11 and the inclined surface 231*a* of the engaging protrusion 231 protruding inside the opening 21 of the housing 22 are pressed against each other. As a result, the moving member 23 moves from the engaging position P1 toward the release position P2 (see FIG. 7) against the biasing force of the elastic member 24. That is to say, the engaging protrusion 231 is retracted to the outside of the opening 21.

As a result, as shown in FIG. 6, the rod 11 enters the opening 21 of the housing 22 until the engaging recess 13 of the rod 11 is positioned adjacent to the engaging protrusion 231 of the moving member 23 in the orthogonal direction (X-axis direction). Then, the moving member 23 returns to the engaging position P1 by the biasing force of the elastic member 24, whereby the engaging protrusion 231 is inserted to the engaging recess 13 of the rod 11.

Through the above process, attachment of the holding device 2 to the cymbal stand 1 is completed.

As shown in FIG. 1, FIG. 2, and FIG. 6, the adjusting part 30 of the holding device 2 is positioned between the engaging part 20 and the supporting part 12 of the cymbal stand 1 when the holding device 2 is attached to the rod 11. Therefore, by moving the adjusting part 30 in the lengthwise direction of the rod 11 relative to the engaging part 20, the distance between the holding device 2 and the supporting part 12 of the cymbal stand 1 can be adjusted. As a result, the form in which the cymbal CY is held between the holding device 2 and the supporting part 12 (for example, the magnitude of the force that holds the cymbal CY) can be adjusted.

When removing the holding device 2 from the rod 11, then as shown in FIG. 7, the moving member 23 of the holding device 2 may be moved from the engaging position P1 to the release position P2 against the biasing force of the elastic member 24. The arrow D2 in FIG. 7 indicates the direction in which moving member 23 is moved toward the release position P2. Here, a part of the moving member 23 is exposed to the outside from the exposing opening 252 of the housing 22. Moreover, the direction in which the moving member 23 is moved from the exposing opening 252 toward the inside of the housing 22 is the direction in which the moving member 23 is moved from the engaging position P1 to the release position P2. As a result, the user of the holding device 2 can easily move the moving member 23 to the release position P2 simply by pressing the moving member 23 toward the inside of the housing 22 with their fingers. When the moving member 23 is moved to the release position P2, the engaging (locking) state between the holding device 2 and the rod 11 is released. Therefore, the rod 11 can be removed from the opening 21 of the housing 22 and the holding device 2 can be detached from the rod 11. The arrow D3 in FIG. 7 indicates the direction in which the holding device 2 is detached from the rod 11.

As described above, since the holding device 2 does not need to be rotated relative to the rod 11, the holding device 2 can be easily attached to and detached from the rod 11 in a short period of time.

As described above, according to the holding structure and the holding device 2 for a cymbal of the present embodiment, the holding device 2 has the pressing part 40 that presses the sliding surface 30*a* of the adjusting part 30 against the engaging part 20 to suppress movement of the adjusting part 30 in the lengthwise direction of the rod 11 relative to the engaging part 20. Therefore, when moving the adjusting part 30 relative to the engaging part 20, frictional force is generated between the sliding surface 30*a* of the adjusting part 30 and the engaging part 20, thereby suppressing the adjusting part 30 from moving relative to the engaging part 20. As a result, it is possible to suppress unwanted changes in the positional relationship between the engaging part 20 and the adjusting part 30. That is to say, unwanted changes in the distance between the holding device 2 attached to the rod 11 and the supporting part 12 are suppressed, whereby unwanted changes are suppressed in the form of holding the cymbal CY between the holding device 2 and the supporting part 12.

Since the positional relationship between the engaging part 20 and the adjusting part 30 is suitably maintained by the pressing part 40 of the holding device 2, even when the holding device 2 is removed from the rod 11 and then re-attached to the rod 11, the distance between the holding device 2 and the supporting part 12 can be easily reproduced. In other words, it is possible to easily reproduce the form in which the cymbal CY is held between the holding device 2 and the supporting part 12.

Moreover, in the holding structure and the holding device 2 for a cymbal of the present embodiment, by rotating the adjusting part 30 relative to the engaging part 20 with the second thread 31 of the adjusting part 30 meshed with the first thread 261 of the engaging part 20, the adjusting part 30 moves in the lengthwise direction of the rod 11 relative to the engaging part 20. Moreover, the pressing part 40 presses the surface of the second thread 31 against the surface of the first thread 261 in the lengthwise direction of the rod 11. As a result, when rotating the second thread 31 of the adjusting part 30 relative to the first thread 261 of the engaging part 20, a large frictional force is generated between the first and second threads 261, 31. This frictional force enables effective suppression of unwanted changes in the positional relationship between the engaging part 20 and the adjusting part 30.

Furthermore, the mechanism for moving the adjusting part 30 in the lengthwise direction of the rod 11 relative to the engaging part 20 is constituted by the first and second threads 261, 31, whereby the relative positional relationship between the engaging part 20 and the adjusting part 30 can be adjusted even more precisely.

Moreover, in the holding structure and the holding device 2 for a cymbal of the present embodiment, the moving member 23 can be held at the engaging position P1 by the elastic member 24. As a result, it is possible to effectively suppress unwanted release of the engaging (locking) state of the holding device 2 from the rod 11.

In addition, by simply moving the moving member 23 from the engaging position P1 to the release position P2 against the biasing force of the elastic member 24, the engaging (locking) state of the holding device 2 on the rod 11 can be easily released. In other words, the holding device 2 can be easily attached to and detached from the rod 11.

Moreover, in the holding structure and the holding device 2 for a cymbal of the present embodiment, the engaging protrusion 231 of the moving member 23 has the inclined surface 231*a* that faces in the direction in which the rod 11 is removed from the opening 21 of the housing 22, and that slopes in the direction in which the rod 11 is inserted into the opening 21, with approaching toward the protruding direction of the engaging protrusion 231. As a result, by simply inserting the rod 11 into the opening 21 of the engaging part 20, the distal end of the rod 11 presses the inclined surface 231*a* of the engaging protrusion 231 positioned at the engaging position P1, whereby the moving member 23 can be moved from the engaging position P1 to the release position P2 against the biasing force of the elastic member 24. In other words, the rod 11 can be easily arranged through the opening 21 of the engaging part 20.

Moreover, in the holding structure and the holding device 2 for a cymbal of the present embodiment, the distal end part of the rod 11 has the inclined surface 11*a* that slopes toward the distal end side of the rod 11, with approaching toward the inner side from the outer side of the rod 11 in the radial direction. As a result, by simply inserting the rod 11 of the cymbal stand 1 into the opening 21 of the engaging part 20, the inclined surface 11*a* of the rod 11 presses the engaging protrusion 231 positioned at the engaging position P1, whereby the moving member 23 can be moved from the engaging position P1 to the release position P2 against the biasing force of the elastic member 24. In other words, the rod 11 can be easily inserted through the opening 21 of the engaging part 20.

Moreover, in the holding structure for a cymbal of the present embodiment, the rod 11 has the engaging recess 13 that is recessed from the side surface thereof and into which the engaging protrusion 231 is inserted. As a result, upon having inserted the rod 11 into the opening 21 of the engaging part 20, by arranging the moving member 23 at the engaging position P1 and inserting the engaging protrusion 231 into the engaging recess 13 of the rod 11, the holding device 2 can be engaged (locked) onto the rod 11. Moreover, since the moving member 23 is held at the engaging position P1 by the elastic member 24, it is possible to effectively suppress the engaging protrusion 231 of the moving member 23 from exiting from the engaging recess 13 of the rod 11. This makes it possible to suppress the holding device 2 from detaching from the rod 11, in contrast to the case of attaching the holding device 2 to the rod 11 by means of a screw thread as practiced conventionally. In addition, by simply moving the moving member 23 from the engaging position P1 to the release position P2 against the biasing force of the elastic member 24, the engaging protrusion 231 of the moving member 23 can be easily removed from the engaging recess 13 of the rod 11. In other words, the holding device 2 can be easily attached to and detached from the rod 11.

Moreover, in the holding structure for a cymbal of the present embodiment, the engaging recess 13 of the rod 11 is formed in a part of the side surface of the rod 11 in the circumferential direction. Therefore, when the engaging protrusion 231 of the engaging part 20 is inserted into the engaging recess 13 of the rod 11, it is possible to prevent the engaging part 20 from rotating in the circumferential direction relative to the rod 11. As a result, the distance between the holding device 2 and the supporting part 12 of the cymbal stand 1 can be easily adjusted while the holding device 2 is still attached to the rod 11. This point will be described below.

In order to adjust the distance between the holding device 2 and the supporting part 12 while the holding device 2 is still attached to the rod 11, the adjusting part 30 of the holding device 2 is rotated relative to the engaging part 20 around the lengthwise direction of the rod 11 serving as the rotation axis thereof. Here, as described above, when the holding device 2 is attached to the rod 11, rotation of the engaging part 20 relative to the rod 11 is prevented. Therefore, by simply pinching and rotating only the adjusting part 30 of the holding device 2 with fingers, the adjusting part 30 can be easily rotated relative to the engaging part 20, and as a result, the adjusting part 30 can be moved relative to the engaging part 20 in the lengthwise direction of the rod 11. In other words, the distance between the holding device 2 and the supporting part 12 can be easily adjusted with one hand.

The present disclosure has been described in detail above, however, the present disclosure is not limited to the above embodiments, and various modifications may be made without departing from the scope of the present disclosure.

In the present disclosure, for example, the first thread 261 of the engaging part 20 may be a female thread, and the second thread 31 of the adjusting part 30 that meshes with the first thread 261 may be a male thread.

In the present disclosure, the adjusting part 30 may simply move in the lengthwise direction of the rod 11 relative to the engaging part 20, for example.

In the present disclosure, it is sufficient that the moving member 23 is movable at least relative to the housing 22 in a direction intersecting the lengthwise direction of the rod 11. In other words, the moving member 23 may be movable relative to the housing 22 in a direction inclined to the lengthwise direction of the rod 11.

According to the present disclosure, it is possible to easily reproduce a form in which a cymbal is held between a holding device and a supporting part of a cymbal stand.

What is claimed is:

1. A holding structure for a cymbal, comprising:

a cymbal stand that includes: a rod configured to be insertable through a cymbal; and a supporting part that is provided on the rod, the supporting part being configured to support the cymbal through which the rod is inserted; and a holding device attachable to the rod, the holding device being configured to clamp the cymbal between the holding device and the supporting part supporting the cymbal, wherein the holding device includes:

an engaging part including an opening in which the rod is arranged in a state where the holding device is attached to the rod, the engaging part being configured to be engaged to the rod in a state of being immovable in a lengthwise direction of the rod;

an adjusting part attached to the engaging part in a state of being movable relative to the engaging part in the lengthwise direction of the rod, the adjusting part being positioned between the engaging part and the supporting part in the state where the holding device is attached to the rod; and a pressing part, wherein the adjusting part includes a sliding surface that is in contact with the engaging part, the sliding surface being configured to slide relative to the engaging part when the adjusting part moves relative to the engaging part, and wherein the pressing part is configured to suppress movement of the adjusting part, in the lengthwise direction of the rod, relative to the engaging part by pressing the sliding surface of the adjusting part against the engaging part.

2. The holding structure for a cymbal according to claim 1, wherein the engaging part includes a first thread having an axis that extends along the lengthwise direction of the rod, wherein the adjusting part includes a second thread configured to threadably engage with the first thread, and the adjusting part is configured to move in the lengthwise direction of the rod relative to the engaging part by being rotated relative to the engaging part in a state where the second thread is threadably engaged with the first thread, wherein the sliding surface is a surface of the second thread that contacts the first thread, and wherein the pressing part is configured to press the surface of the second thread against the first thread.

3. The holding structure for a cymbal according to claim 1, wherein the engaging part further includes:

a housing including the opening;

a moving member arranged within the housing, the moving member being movable between an engaging position and a release position, the engaging position being a position at which the moving member is engaged with the rod, the release position being a position at which the moving member is not engaged with the rod; and an elastic member configured to bias the moving member toward the engaging position.

4. The holding structure for a cymbal according to claim 3, wherein the moving member is configured to be movable, between the engaging position and the release position and relative to the housing, in a direction intersecting the lengthwise direction of the rod, and the moving member includes an engaging protrusion, the engaging protrusion being disposed in the opening in a state where the moving member is arranged at the engaging position and being disposed outside the opening in a state where the moving member is arranged at the release position, and wherein the engaging protrusion includes an inclined surface configured to be pressed against an inclined surface of the rod when the holding device is being attached to the rod.

5. The holding structure for a cymbal according to claim 3, wherein the moving member is configured to be movable, between the engaging position and the release position and relative to the housing, in a direction intersecting the lengthwise direction of the rod, and the moving member includes an engaging protrusion, the engaging protrusion being disposed in the opening in a state where the moving member is arranged at the engaging position and being disposed outside the opening in a state where the moving member is arranged at the release position, and wherein the rod includes an inclined surface at a distal end part of the rod, the inclined surface being configured to be pressed against an inclined surface of the engaging protrusion when the holding device is being attached to the rod.

6. The holding structure for a cymbal according to claim 1, wherein the engaging part further includes:

a housing including the opening;

a moving member arranged within the housing, the moving member being movable between an engaging position and a release position, the engaging position being a position at which the moving member is engaged with the rod, the release position being a position at which the moving member is not engaged with the rod; and an elastic member configured to bias the moving member toward the engaging position, wherein the moving member is configured to be movable, between the engaging position and the release position and relative to the housing, in a direction intersecting the lengthwise direction of the rod, and the moving member includes an engaging protrusion, the engaging protrusion being disposed in the opening in a state where the moving member is arranged at the engaging position and being disposed outside the opening in a state where the moving member is arranged at the release position, and wherein the rod includes an engaging recess that is recessed from a side surface of the rod and into which the engaging protrusion is inserted in the state where the moving member is arranged at the engaging position.

7. The holding structure for a cymbal according to claim 6, wherein the engaging recess is formed in a part of a side surface of the rod in a circumferential direction of the rod.

8. A holding device for a cymbal stand, wherein the cymbal stand includes a rod configured to be insertable through a cymbal and a supporting part that is provided on the rod, the supporting part being configured to support the cymbal through which the rod is inserted, the holding device being configured to be attachable to the rod, and the holding device being configured to clamp the cymbal between the holding device and the supporting part supporting the cymbal, the holding device comprising:

an engaging part including an opening in which the rod is arranged in a state where the holding device is attached to the rod, the engaging part being configured to be engaged to the rod in a state of being immovable in a lengthwise direction of the rod;

an adjusting part attached to the engaging part in a state of being movable relative to the engaging part in the lengthwise direction of the rod, the adjusting part being positioned between the engaging part and the supporting part in the state where the holding device is attached to the rod; and a pressing part, wherein the adjusting part includes a sliding surface that is in contact with the engaging part, the sliding surface being configured to slide relative to the engaging part when the adjusting part moves relative to the engaging part; and wherein the pressing part is configured to suppress movement of the adjusting part, in the lengthwise direction of the rod, relative to the engaging part by pressing the sliding surface of the adjusting part against the engaging part.

* * * * *